United States Patent
Haycock et al.

(10) Patent No.: US 7,171,510 B2
(45) Date of Patent: Jan. 30, 2007

(54) ON-CHIP OBSERVABILITY BUFFER TO OBSERVER BUS TRAFFIC

(75) Inventors: Matthew B. Haycock, Beaverton, OR (US); Shekhar Y. Borkar, Beaverton, OR (US); Stephen R. Mooney, Beaverton, OR (US); Aaron K. Martin, Hillsboro, OR (US); Joseph T. Kennedy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 09/752,880

(22) Filed: Dec. 28, 2000

(65) Prior Publication Data

US 2002/0095622 A1    Jul. 18, 2002

(51) Int. Cl.
  *G06F 13/36*  (2006.01)
  *G06F 13/14*  (2006.01)
  *G06F 11/00*  (2006.01)
  *G01R 31/00*  (2006.01)
  *G01R 31/14*  (2006.01)

(52) U.S. Cl. .................. 710/310; 710/305; 714/25; 714/39; 702/117

(58) Field of Classification Search .................. 714/37, 714/25, 39, 45–46, 48; 710/15, 18, 310, 710/52, 305; 702/117, 122
See application file for complete search history.

(56) References Cited

U.S. PATENT DOCUMENTS 5,488,688 A * 1/1996 Gonzales et al. ............. 714/34
5,604,450 A * 2/1997 Borkar et al. ................. 326/82
5,666,302 A * 9/1997 Tanaka et al. ............... 708/819
5,801,549 A * 9/1998 Cao et al. ...................... 326/83
5,903,719 A * 5/1999 Yamamoto .................... 714/38
5,933,594 A * 8/1999 La Joie et al. ................ 714/26

(Continued)

OTHER PUBLICATIONS

The Memory Bus: in The PC Guide, Version 2.1.1, Version Date: Dec. 18, 2000 [online], [retrieved on Nov. 13, 2003]. Retrieved from the Internet <URL: http://web.archive.org/web/20010122053800/http://www.pcguide.com/ref/ram/timingBus-c.html<.*

(Continued)

*Primary Examiner*—Mark H. Rinehart
*Assistant Examiner*—Thomas J. Cleary
(74) *Attorney, Agent, or Firm*—Blakely, Sokoloff, Taylor & Zafman LLP

(57) ABSTRACT

The invention provides, in an embodiment, an apparatus, method and means for unintrusively observing, echoing and reading signals transmitted by one of a bus and wireless communication, without disturbing electrical properties of the bus, without adding bus latency, and without adding signal discontinuities. In an aspect, a buffer having a trigger is coupled with a component that connects to a memory bus, the buffer echoes signals to an observability port, and a diagnostic device reads the echoed signals. In an aspect, the bus is one of a simultaneous bi-directional (SBD) bus having ternary logic levels, a single ended bus, a differential bus, an optically coupled bus, a chipset bus, a frontside bus, an input/output (I/O) bus, a peripheral component interface (PCI) bus, and an industry standard architecture (ISA) bus. In an aspect, the buffer echoes bus signals having frequencies between 500 MHz. and 5 GHz. In an aspect, the buffer echoes bus signals having frequencies of at least 5 GHz.

12 Claims, 2 Drawing Sheets

U.S. PATENT DOCUMENTS

| | | | | |
|---|---|---|---|---|
| 5,961,578 A | * | 10/1999 | Nakada | 708/491 |
| 6,072,804 A | * | 6/2000 | Beyers, Jr. | 370/450 |
| 6,119,254 A | * | 9/2000 | Assouad et al. | 714/724 |
| 6,128,754 A | * | 10/2000 | Graeve et al. | 714/39 |
| 6,147,863 A | * | 11/2000 | Moore et al. | 361/686 |
| 6,496,583 B1 | * | 12/2002 | Nakamura et al. | 380/268 |
| 6,587,679 B1 | * | 7/2003 | Hokao | 455/161.1 |
| 6,601,196 B1 | * | 7/2003 | Dabral et al. | 714/43 |
| 6,661,303 B1 | * | 12/2003 | Ghoshal | 333/1 |
| 6,704,277 B1 | * | 3/2004 | Dabral et al. | 370/201 |
| 6,781,406 B2 | * | 8/2004 | Emberling et al. | 326/38 |

OTHER PUBLICATIONS

"The Free On-Line Dictionary of Computing" [entry 'bus']. Online Mar. 20, 2000. Retrieved Oct. 1, 2004. <http://foldoc.doc.ic.ac.uk/foldoc/foldoc.cgi?query=bus>.*

"The Free On-Line Dictionary of Computing" [entry 'wireless']. Online Feb. 27, 1995. Retrieved Oct. 1, 2004. <http://foldoc.doc.ic.ac.uk/foldoc/foldoc.cgi?query=wireless>.*

Kozierok, Charles M. "The PC Guide" [entry 'The Memory Bus']. Version 2.1.1. Online Dec. 18, 2000. Retrieved Nov. 13, 2003. <http://web.archive.org/web/20010122053800/http://www.pcguide.com/ref/ram/timiingBus-c.html>.*

"Microsoft Press Computer Dictionary" [entries 'bus' and 'wireless']. Third Edition. Copyright 1997 Microsoft Corporation. pp. 68 and 510.*

Mooney, Randy, et al., "A 900 Mb/s Bidirectional Signalling Scheme". IEEE Journal of Solid-State Circuits. vol. 30, No. 12. Dec. 1995. pp. 1538-1543.*

"The Free On-Line Dictionary of Computing". [entry: hardware]. Online Jan. 23, 1997. Retrieved Mar. 31, 2006. <http://foldoc.org/foldoc/foldoc.cgi?query=hardware>.*

* cited by examiner

ON-CHIP OBSERVABILITY BUFFER TO OBSERVER BUS TRAFFIC

FIELD

This invention relates to an observability buffer, more particularly, a buffer for unintrusively observing, and echoing to a diagnostic device, signals transmitted by one of a bus and wireless communication, without disturbing electrical properties of the bus, without adding bus latency, and without adding signal discontinuities.

BACKGROUND

Computer systems commonly use busses to transfer data between devices that include processors, storage devices and input/output (I/O) devices. Many of such busses use one or more data lines, which are electrical conductors on which signals are used to transfer data in concert with a clock signal and/or one or more control signals. In a ternary bus, each device must use the data it is transmitting to derive the data being received, and debugging such a bus to diagnose problems or confirm functionality is rendered more difficult. Diagnostic tools, such as a logic analyzer, have failed to monitor the data being transferred between two devices by the simple attachment of probes to the conductors of a ternary bus. Further, as computer systems move towards the use of multi-stage pipelines and large symmetric multiprocessor (SMP) shared cache structures, the ability to debug, analyze, and verify actual hardware becomes increasingly difficult, during development, testing, and normal operations.

BRIEF DESCRIPTION OF THE DRAWINGS

Additional advantages of the invention will become apparent upon reading the following detailed description and upon reference to the drawings, in which.

DETAILED DESCRIPTION

Exemplary embodiments are described with reference to specific configurations. Those skilled in the art will appreciate that various changes and modifications can be made while remaining within the scope of the claims.

An increasing number of busses now transfer data at rates high enough that the attachment of probes to conductors of a bus will alter the electrical and/or timing characteristics of the bus such that data integrity is adversely effected or the functionality of the bus is impaired. It is often desirable for testing to monitor complex events so that useful debug and performance information can be captured in a fast, unintrusive manner. Further, efforts are currently being made to accelerate the convergence of voice, video and data in corporate networks and enable users to easily exchange larger graphics and imaging files. In an embodiment, the invention is used in high-speed network connectivity having data rates in the gigabit per second range.

In an embodiment, the invention provides an apparatus method and means for unintrusively observing, echoing and reading signals transmitted by one of a bus and wireless communication, without disturbing electrical properties of the bus, without adding bus latency, and without adding signal discontinuities.

In an embodiment, the invention provides an apparatus method and means to observe and echo bus signals for diagnostic purposes and other purposes. In an embodiment, the invention eliminates the need to directly probe a bus, and opens a way to use any form of signaling on a bus. A bus may be a simultaneous bi-directional (SBD) bus having ternary logic levels, not unintrusively observable by conventional bus probing techniques. In an embodiment, the present invention provides observability of signals on a SBD bus using conventional logic analysis techniques, while the bus operates at maximum speed.

In an embodiment, a buffer is provided that connects to a bus and observes and echoes signals transmitted on a bus. In an embodiment, the buffer is integrated on a component which connects to a bus. In an embodiment, the buffer echoes bus signals having frequencies between 500 MHz. and 5 GHz. In an embodiment, the buffer echoes bus signals having frequencies of at least 5 GHz.

Figure 1:
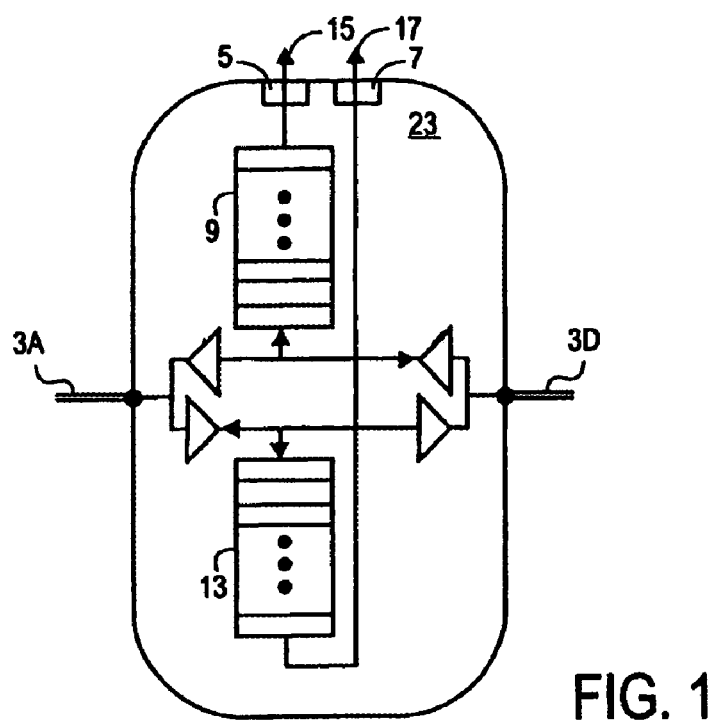
FIG. 1 depicts a schematic diagram of an embodiment of the invention.

An embodiment of the invention is shown as component 23 in FIG. 1. Buffer 9 and buffer 13, connected with bus 3*a* and bus 3*d*, observe signals transmitted on bus 3*a* and bus 3*d*. In an embodiment, bus 3*a* and bus 3*d* are SBD busses. In an embodiment, buffer 9 and buffer 13 observe and echo signals transmitted by wireless communication. In an embodiment, buffer 9 and buffer 13 are integrated on a component which connects to a bus. The signals from buffer 9 are echoed to observability port 5, and the signals from buffer 13 are echoed to observability port 7. In an embodiment, a diagnostic device, connected with observability bus 15 which is connected with observability port 5, performs at least one of detecting echoed signals, accessing echoed signals and reading echoed signals. Also, the diagnostic device, connected with observability bus 17 which is connected with observability port 7, performs at least one of detecting echoed signals, accessing echoed signals and reading echoed signals. In an embodiment, observability ports 5 and 7 are logic observability ports.

In an embodiment, bus 3*a* and bus 3*d* are memory busses. In an embodiment, bus 3*a* and bus 3*d* are one of data busses, address busses, and control busses. In an embodiment, buses 3*a* and 3*d* are one of a SBD bus having ternary logic levels, a single ended bus, a differential bus, a peripheral component interconnect (PCI) bus, an industry standard architecture (ISA) expansion bus, a chipset bus, a frontside bus, an I/O bus, and a bus over which a plurality of data are transmitted. In an embodiment, bus 3*a* and bus 3*d* are one of 16 bit busses, 32 bit busses, etc.

Although the present invention is described in the context of busses carrying signals across rigid interconnections spanning relatively short distances between electronic components within a computer system, in an embodiment, the present invention is also applicable to the transmission of signals across cables or other flexible interconnections, including optical fibers, spanning longer distances between electronic components of computers or other varieties of electronic devices.

In an embodiment, bus 3*a* and bus 3*d* are ternary logic busses that enables the substantially SBD transfer of data in such a way that it is not possible for a third device to derive the data being transferred by attaching probes to conductors of bus 3*a* or bus 3*d* and monitoring the voltage levels of those conductors. In an embodiment, bus 3a and bus 3d transfers data at speeds sufficiently high, or rely on differences between voltage levels that are sufficiently small, that it is not possible to attach probes to the conductors of either bus 3a or bus 3d without altering the electrical characteristics of those conductors such that data integrity is adversely effected, or such that timing parameters required for normal operation of the bus are violated. In an embodiment, bus 3a and bus 3d are ternary logic busses enabling substantially SBD transfers at speeds sufficiently high that both difficulties are encountered when attaching probes to the conductors of bus 3a and bus 3d.

In an embodiment, buffer 9 and buffer 13 include at least one trigger to observe or capture signals. In an embodiment, the trigger operates in various manners. In one embodiment, buffer 9 and buffer 13 are expandable and capture every bus signal in a first in-first out basis. In an embodiment, a trigger instructs buffer 9 and buffer 13 to capture the following finite specific bus signals. In a further embodiment, a trigger provides a specific control signal and address signal instructing buffer 9 and buffer 13 to capture bus signals. In yet a further embodiment, buffer 9 and buffer 13 are triggered to capture bus signals at an indicated time.

Figure 2:
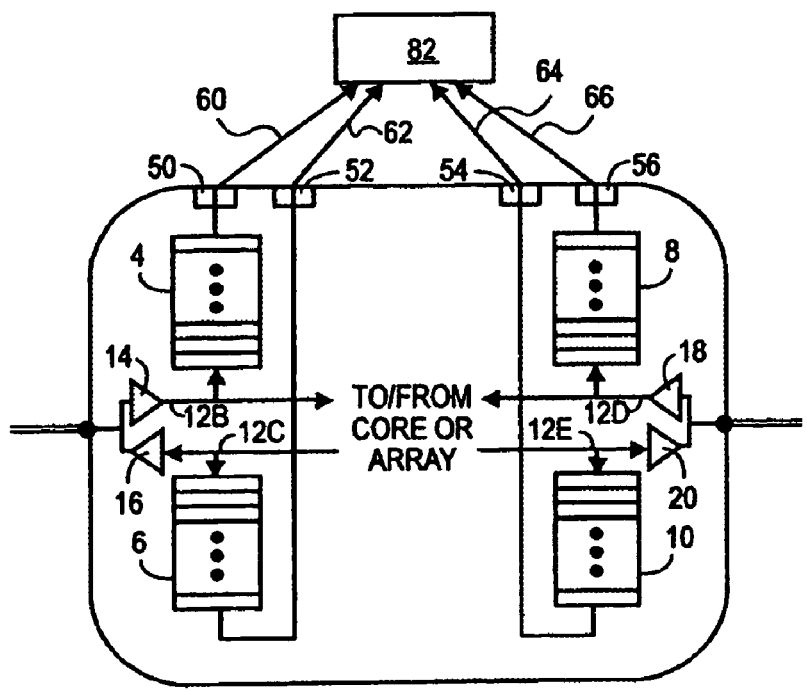
FIG. 2 depicts a schematic diagram of an embodiment of the invention integrated on a component connected to a bus.

As shown in FIG. 2, in an embodiment of the invention, buffer 4, buffer 6, buffer 8 and buffer 10 are integrated on component 76. Component 76 connects to a bus. In an embodiment, component 76 is a memory component. Buffer 4 observes signals on bus 12b, coming from I/O receiver 14, and continuing on to the core or array of component 76. Buffer 6 observes signals on bus 12c, coming from the core or array of component 76, and continuing on to I/O transmitter 16. Likewise, buffer 8 observes signals on bus 12d, coming from I/O receiver 18, and continuing on to the core or array of component 76. Buffer 10 observes signals on bus 12e, coming from the core or array of component 76, and continuing on to I/O transmitter 20. The signals from buffer 4 are echoed to observability port 50, the signals from buffer 6 are echoed to observability port 52, the signals from buffer 8 are echoed to observability port 56, and the signals from buffer 10 are echoed to observability port 54.

In an embodiment, diagnostic device 82, connected with observability bus 60 which is connected with observability port 50, performs at least one of detecting echoed signals, accessing echoed signals and reading echoed signals. Diagnostic device 82, connected with observability bus 62 which is connected with observability port 52, performs at least one of detecting echoed signals, accessing echoed signals and reading echoed signals. Diagnostic device 82, connected with observability bus 64 which is connected with observability port 54, performs at least one of detecting echoed signals, accessing echoed signals and reading echoed signals. Also, diagnostic device 82, connected with observability bus 66 which is connected with observability port 56, performs at least one of detecting echoed signals, accessing echoed signals and reading echoed signals. In an embodiment, diagnostic device 82 is one of a logic analyzer and a bus analyzer of the variety commonly used in debugging busses, however, diagnostics device 82 could be any of a variety of devices using signal inputs to aid in debugging busses. Although FIG. 2 depicts the use of four ports and four busses in connecting component 76 and diagnostics device 82, the quantity and nature of the coupling is not so limited.

Figure 3:
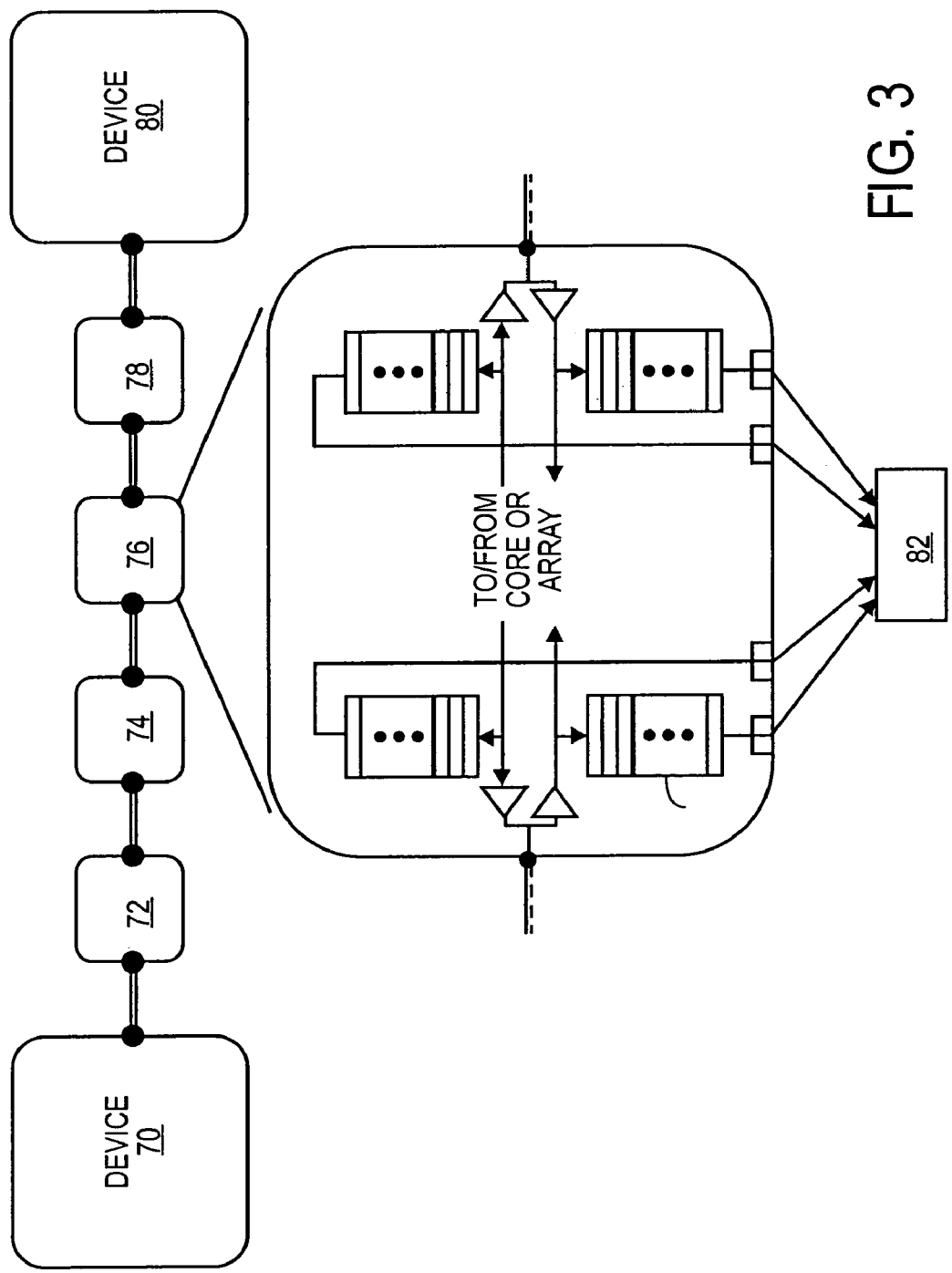
FIG. 3 depicts a schematic diagram of an embodiment of the invention as in FIG. 2, the component being dynamic random access memory (DRAM).

In an embodiment of the invention, as shown in FIG. 3, buffer 4, buffer 6, buffer 8 and buffer 10 are integrated on component 76 which connects to a bus. In an embodiment, component 76 is dynamic random access memory (DRAM). Components 72, component 74, and component 78 are also DRAM components which are connected with device 70 and device 80. In an embodiment, device 70 and device 80 are each one of a processor, a storage device, a graphics controller coupled to a display, an I/O device such as disk controller or an I/O interface for such devices as a keyboard, mouse or printer, etc. Alternatively, in an embodiment, device 70 and device 80 are each a bridge device providing access to another bus.

In an embodiment, the invention can be used in components that connect to a memory bus, including DRAMs, chip sets, memory controllers, microprocessors, microcontrollers, etc.

In an embodiment, a system is provided. The system includes memory, an I/O port, and a microprocessor. The memory, I/O port, and microprocessor are connected by a data bus, address bus and control bus. The microprocessor includes a buffer having at least one trigger, coupled with one of the busses and a component connected with the busses, configured to observe and echo at least one of signals transmitted on the bus, signals transmitted into the component and signals transmitted out of the component. In an embodiment, the system includes an observability port coupled with the buffer configured to receive the echoed signals, an observability bus connected with the observability port, and a diagnostic device being at least one of a logic analyzer and a bus analyzer connected with the observability bus and performing at least one of detecting the echoed signals, accessing the echoed signals and reading the echoed signals. In an embodiment, the observability port is a logic observability port. In an embodiment, the bus is one of a SBD having ternary logic levels, a single ended bus, a differential bus, an optically coupled bus, a chipset bus, a frontside bus, an I/O bus, a PCI bus, and an ISA expansion bus. In an embodiment, the buffer is configured to observe and echo signals transmitted by wireless communication.

In an embodiment, a system is provided. The system includes memory, an I/O port, and a microprocessor. The memory, I/O port, and microprocessor are connected by a data bus, address bus and control bus. The microprocessor includes an apparatus having a means for observing and echoing at least one of signals transmitted on a bus, signals transmitted into a component and signals transmitted out of a component. In an embodiment, the apparatus includes means for receiving echoed signals, and means for performing at least one of detecting echoed signals, accessing echoed signals and reading echoed signals. In an embodiment, the bus is one of a SBD having ternary logic levels, a single ended bus, a differential bus, an optically coupled bus, a chipset bus, a frontside bus, an I/O bus, a PCI bus, and an ISA expansion bus. In an embodiment, the signals are transmitted by wireless communication.

Having disclosed exemplary embodiments, modifications and variations may be made to the disclosed embodiments while remaining within the spirit and scope of the invention as defined by the appended claims.

What is claimed is:

1. An apparatus comprising:
   an observability buffer having a trigger, wherein the observability buffer is integrated on a first component which is capable of being communicably coupled with a second component via a simultaneous bi-directional (SBD) interface having ternary logic levels, wherein the observability buffer is configured to un-intrusively observe and echo one or more of a plurality of signals transmitted between the first component and the second component based on one or more of a control signal-based indication, an address signal-based indication, and a time-based indication; and an observability port on the first component capable of receiving the echoed signals from the observability buffer and providing a diagnostic device access to the echoed signals.

2. The apparatus of claim 1, wherein the diagnostic device comprises one or more of a logic analyzer and a bus analyzer, the diagnostic device coupled to an observability bus, the observability bus further coupled to the observability port.

3. The apparatus of claim 1, wherein the plurality of signals are communicated via a wireless communication.

4. The apparatus of claim 1, wherein the echoed signals comprise frequencies between a minimum frequency of 5 gigahertz (GHz) and a maximum frequency of 500 gigahertz (GHz).

5. A method comprising:

transmitting a plurality of signals between a first component and a second component on a simultaneous bi-directional (SBD) interface having ternary logic levels, wherein the first component includes an observability buffer integrated on the first component;

un-intrusively observing one or more of the plurality of signals transmitted on the SBD interface; and echoing the one or more of the plurality of observed signals to an observability port integrated on the first device based on a received trigger signal, wherein the observability port is capable of interfacing with a diagnostic device, relaying the echoed signals to the diagnostic device, and includes a logic observability port.

6. The method of claim 5, wherein the diagnostic device comprises one or more of a logic analyzer and a bus analyzer, the diagnostic device coupled to an observability bus, the observability bus further coupled to the observability port.

7. The method of claim 5, further comprising communicating the plurality of signals via a wireless communication.

8. The method of claim 5, wherein the echoed signals comprise frequencies between a minimum frequency of 5 gigahertz (GHz) and a maximum frequency of 500 gigahertz (GHz).

9. A system comprising:

a memory communicably coupled with a microprocessor, wherein the microprocessor includes an integrated observability buffer;

a first component communicably coupled to the microprocessor through a simultaneous bi-directional (SBD) interface having ternary logic levels;

wherein the observability buffer un-intrusively observes and echoes at least one of a plurality of signals transmitted on the SBD interface between the first component and the microprocessor;

an observability port communicably coupled with the observability buffer, the observability port to receive the echoed signals, wherein the observability port includes a logic observability port; and a diagnostic device communicably coupled with the observability buffer by interfacing with the observability port, wherein the diagnostic device is capable of one or more of detecting, accessing, and reading of the echoed signals.

10. The system of claim 9, wherein the diagnostic device comprises one or more of a logic analyzer and a bus analyzer, the diagnostic device coupled to an observability bus, the observability bus further coupled to the observability port.

11. The system of claim 9, wherein the plurality of signals are communicated via a wireless communication.

12. The system of claim 9, wherein the plurality of echoed signals comprise frequencies between a minimum frequency of 5 gigahertz (GHz) and a maximum frequency of 500 gigahertz (GHz).

* * * * *

UNITED STATES PATENT AND TRADEMARK OFFICE
CERTIFICATE OF CORRECTION

PATENT NO.       : 7,171,510 B2                                      Page 1 of 1
APPLICATION NO.  : 09/752880
DATED            : January 30, 2007
INVENTOR(S)      : Haycock et al.

It is certified that error appears in the above-identified patent and that said Letters Patent is hereby corrected as shown below:

In column 6, at line 10, delete "hi" and insert --bi--.

Signed and Sealed this

Fifteenth Day of April, 2008

JON W. DUDAS
*Director of the United States Patent and Trademark Office*